(12) United States Patent
Kamran et al.

(10) Patent No.: US 11,531,470 B2
(45) Date of Patent: Dec. 20, 2022

(54) OFFLOAD OF STORAGE SYSTEM DATA RECOVERY TO STORAGE DEVICES

(71) Applicant: EMC IP Holding Company LLC, Hopkinton, MA (US)

(72) Inventors: Lior Kamran, Rishon LeZion (IL); Amitai Alkalay, Kadima (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 236 days.

(21) Appl. No.: 17/075,820

(22) Filed: Oct. 21, 2020

(65) Prior Publication Data

US 2022/0121377 A1 Apr. 21, 2022

(51) Int. Cl.
*G06F 11/10* (2006.01)
*G06F 3/06* (2006.01)

(52) U.S. Cl.
CPC .......... *G06F 3/0619* (2013.01); *G06F 3/0653* (2013.01); *G06F 3/0659* (2013.01); *G06F 3/0689* (2013.01); *G06F 11/1092* (2013.01)

(58) Field of Classification Search
CPC . G06F 3/0619; G06F 11/1092; G06F 11/1076
See application file for complete search history.

(56) References Cited

U.S. PATENT DOCUMENTS

| | | | |
|---|---|---|---|
| 7,165,155 B1 | 1/2007 | Duprey et al. | |
| 7,440,982 B2 | 10/2008 | Lu et al. | |
| 7,444,464 B2 | 10/2008 | Urmston et al. | |
| 7,856,528 B1 * | 12/2010 | Frost | G06F 11/108 711/170 |
| 8,095,726 B1 | 1/2012 | O'Connell et al. | |

(Continued)

FOREIGN PATENT DOCUMENTS

WO 2016111954 A1 7/2016
WO PCT/US2019/024885 1/2020

(Continued)

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Kamini B Patel
(74) *Attorney, Agent, or Firm* — Ryan, Mason & Lewis, LLP

(57) ABSTRACT

A storage system comprises a plurality of storage devices that are configured to store data pages. The data pages are distributed across the plurality of storage devices in a plurality of data stripes. A processing device of a storage controller is configured to identify a data stripe that corresponds to a given data page that was stored on a failed storage device and to provide an indication of the identified data stripe to a first storage device. A first processing device of the first storage device is configured to obtain data pages corresponding to the identified data stripe from at least one storage device other than the failed storage device and to perform a parity calculation based at least in part on the obtained data pages to rebuild the given data page. The rebuilt given data page is then stored on a third storage device.

20 Claims, 7 Drawing Sheets

(56) References Cited

U.S. PATENT DOCUMENTS

| | | |
|---|---|---|
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |
| 9,286,003 B1 | 3/2016 | Hallak et al. |
| 9,514,014 B2 | 12/2016 | Webman et al. |
| 9,552,258 B2 | 1/2017 | Hallak et al. |
| 9,606,870 B1 | 3/2017 | Meiri et al. |
| 9,716,754 B2 | 7/2017 | Swift |
| 9,891,994 B1 | 2/2018 | Schneider et al. |
| 10,176,046 B1 | 1/2019 | Hu et al. |
| 10,261,693 B1 | 4/2019 | Schneider et al. |
| 10,324,640 B1 | 6/2019 | Chen et al. |
| 10,338,851 B1 | 7/2019 | Kronrod et al. |
| 10,359,965 B1 | 7/2019 | Strange et al. |
| 10,394,485 B1 | 8/2019 | Chen et al. |
| 10,437,501 B1 | 10/2019 | Kucherov et al. |
| 10,437,855 B1 | 10/2019 | Strange et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,672 B2 | 12/2019 | Meiri et al. |
| 10,558,613 B1 | 2/2020 | Shveidel et al. |
| 10,592,159 B2 | 3/2020 | Kucherov et al. |
| 10,592,161 B1 | 3/2020 | Chen et al. |
| 10,606,519 B1 | 3/2020 | Shveidel |
| 10,635,533 B2 | 4/2020 | Schneider et al. |
| 10,684,915 B2 | 6/2020 | Schneider et al. |
| 10,691,355 B2 | 6/2020 | Kucherov et al. |
| 10,691,373 B2 | 6/2020 | Harduf et al. |
| 10,691,551 B2 | 6/2020 | Meiri et al. |
| 10,698,772 B2 | 6/2020 | Hu et al. |
| 10,705,965 B2 | 7/2020 | Shveidel et al. |
| 10,719,253 B2 | 7/2020 | Alkalay et al. |
| 10,725,855 B2 | 7/2020 | Shani et al. |
| 10,754,559 B1 | 8/2020 | Meiri et al. |
| 10,754,575 B2 | 8/2020 | Strange |
| 10,754,736 B2 | 8/2020 | Shani et al. |
| 10,761,933 B2 | 9/2020 | Moore et al. |
| 10,783,038 B2 | 9/2020 | Moore et al. |
| 11,061,618 B1* | 7/2021 | Glimcher ............ G06F 16/2379 |
| 11,079,969 B1* | 8/2021 | Glimcher ............ G06F 3/0659 |
| 2003/0200478 A1* | 10/2003 | Anderson ............ H04L 1/22 714/E11.034 |
| 2005/0210318 A1* | 9/2005 | Marks ............ G06F 11/0727 714/6.32 |
| 2007/0022121 A1 | 1/2007 | Bahar et al. |
| 2008/0279462 A1 | 11/2008 | Celi, Jr. |
| 2009/0132955 A1 | 5/2009 | Garg et al. |
| 2009/0276593 A1 | 11/2009 | Jacobson et al. |
| 2010/0179941 A1 | 7/2010 | Agrawal et al. |
| 2011/0022566 A1 | 1/2011 | Beaverson et al. |
| 2011/0225123 A1 | 9/2011 | D'Souza et al. |
| 2012/0124282 A1 | 5/2012 | Frank et al. |
| 2013/0031300 A1* | 1/2013 | Seo ............ G06F 11/108 711/E12.008 |
| 2013/0305002 A1 | 11/2013 | Hallak et al. |
| 2013/0325824 A1 | 12/2013 | Shoens |
| 2014/0181016 A1 | 6/2014 | Whitehead et al. |
| 2014/0244935 A1 | 8/2014 | Ezra et al. |
| 2015/0378766 A1 | 12/2015 | Beveridge et al. |
| 2015/0378785 A1 | 12/2015 | Tarasuk-Levin et al. |
| 2016/0150012 A1 | 5/2016 | Barszczak et al. |
| 2016/0170987 A1 | 6/2016 | Kesselman |
| 2016/0202927 A1 | 7/2016 | Klarakis et al. |
| 2016/0224259 A1 | 8/2016 | Ahrens et al. |
| 2016/0261513 A1 | 9/2016 | Aingaran et al. |
| 2016/0345207 A1 | 11/2016 | Kwak et al. |
| 2017/0075842 A1 | 3/2017 | Su et al. |
| 2017/0185529 A1 | 6/2017 | Chhabra et al. |
| 2017/0192857 A1 | 7/2017 | Meiri et al. |
| 2018/0095873 A1 | 4/2018 | Nakagoe et al. |
| 2019/0303490 A1 | 10/2019 | Chen et al. |
| 2019/0370354 A1 | 12/2019 | Kucherov et al. |
| 2019/0370355 A1 | 12/2019 | Kucherov et al. |
| 2019/0370356 A1 | 12/2019 | Kucherov et al. |
| 2019/0370357 A1 | 12/2019 | Kucherov et al. |
| 2019/0392060 A1 | 12/2019 | Meiri et al. |
| 2020/0026616 A1 | 1/2020 | Hu et al. |
| 2020/0097174 A1 | 3/2020 | Moore et al. |
| 2020/0097363 A1 | 3/2020 | Moore et al. |
| 2020/0097393 A1 | 3/2020 | Moore et al. |
| 2020/0125276 A1 | 4/2020 | Shani et al. |
| 2020/0218601 A1 | 7/2020 | Schneider et al. |
| 2020/0218610 A1 | 7/2020 | Schneider et al. |
| 2020/0225849 A1 | 7/2020 | Meiri et al. |
| 2020/0226023 A1 | 7/2020 | Meiri |
| 2020/0226145 A1 | 7/2020 | Meiri |
| 2020/0233704 A1 | 7/2020 | Alkalay et al. |
| 2020/0233705 A1 | 7/2020 | Alkalay et al. |
| 2020/0233881 A1 | 7/2020 | Harduf et al. |
| 2020/0242130 A1 | 7/2020 | Chen et al. |
| 2020/0249868 A1 | 8/2020 | Glimcher et al. |
| 2020/0249869 A1 | 8/2020 | Glimcher et al. |
| 2020/0250089 A1 | 8/2020 | Kamran et al. |
| 2020/0250144 A1 | 8/2020 | Natanzon et al. |
| 2020/0272542 A1 | 8/2020 | Meiri et al. |
| 2020/0272600 A1 | 8/2020 | Natanzon et al. |
| 2020/0285268 A1 | 9/2020 | Meiri et al. |
| 2020/0285402 A1 | 9/2020 | Meiri et al. |
| 2020/0301784 A1 | 9/2020 | Chen |
| 2020/0310649 A1 | 10/2020 | Chen et al. |
| 2020/0310654 A1 | 10/2020 | Meiri et al. |
| 2020/0326877 A1 | 10/2020 | Chen et al. |
| 2020/0327024 A1 | 10/2020 | Alkalay et al. |

FOREIGN PATENT DOCUMENTS

| | | |
|---|---|---|
| WO | PCT/US2019/024900 | 1/2020 |
| WO | 2020204880 A1 | 10/2020 |
| WO | 2020204882 A1 | 10/2020 |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "Emc Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/662,708 filed in the name of Xiangping Chen et al, filed Jul. 28, 2017, and entitled "Token-Based Data Flow Control in a Clustered Storage System.".

(56) References Cited

OTHER PUBLICATIONS

U.S. Appl. No. 15/793,121 filed in the name of David Meiri et al, filed Oct. 25, 2017, and entitled "Opportunistic Compression of Replicated Data in a Content Addressable Storage System.".
U.S. Appl. No. 15/824,536 filed in the name of Christopher Sayles et al, filed Nov. 28, 2017, and entitled "Storage System with Asynchronous Messaging between Processing Modules for Data Replication.".
U.S. Appl. No. 16/343,942 filed in the name of Yonatan Shtarkman et al, filed Apr. 22, 2019, and entitled "Snapshot-Enabled Storage System Implementing Algorithm for Efficient Reclamation of Snapshot Storage Space.".
U.S. Appl. No. 16/343,949 filed in the name of Asaf Porath et al, filed Apr. 22, 2019, and entitled "Snapshot-Enabled Storage System Implementing Algorithm for Efficient Reading of Data from Stored Snapshots.".
U.S. Appl. No. 16/396,897 filed in the name of Anton Kucherov et al, filed Apr. 29, 2019, and entitled "Storage System with Deduplication-Aware Replication Implemented Using a Standard Storage Command Protocol.".
U.S. Appl. No. 16/413,050 filed in the name of Xiangping Chen et al, filed May 15, 2019, and entitled "Storage System with Coordinated Recovery across Multiple Input-Output Journals of Different Types.".
U.S. Appl. No. 16/530,121 filed in the name of Anton Kucherov et al, filed Aug. 2, 2019, and entitled "Memory-Efficient Processing of Raid Metadata Bitmaps.".
U.S. Appl. No. 16/663,524 filed in the name of Xiangping Chen et al, filed Oct. 25, 2019, and entitled "Storage System with Throughput-Based Timing of Synchronous Replication Recovery.".
U.S. Appl. No. 16/665,651 filed in the name of Lior Kamran et al, filed Oct. 28, 2019, and entitled "Recovery Flow with Reduced Address Lock Contention in a Content Addressable Storage System.".
U.S. Appl. No. 16/671,824 filed in the name of Lior Kamran et al, filed Nov. 1, 2019, and entitled "Storage System Capacity Expansion Using Mixed-Capacity Storage Devices.".
U.S. Appl. No. 16/693,858 filed in the name of Doron Tai, filed Nov. 25, 2019, and entitled "Storage System with Prioritized RAID Rebuild.".

\* cited by examiner

OFFLOAD OF STORAGE SYSTEM DATA RECOVERY TO STORAGE DEVICES

FIELD

The field relates generally to information processing systems, and more particularly to storage in information processing systems.

BACKGROUND

In many information processing systems, storage systems are key elements. Some storage systems implement a Redundant Array of Independent Disks (RAID) protection scheme for storing the data which allows the storage system to recover data in the event of a storage device failure. For example, when a storage device fails in the RAID protection scheme, a data block that was stored on the failed storage device may be recovered and rebuilt using calculations based on data blocks stored on the remaining storage devices in a corresponding row or diagonal of the corresponding stripe of the RAID protection scheme. The use of RAID protection schemes, however, faces various challenges.

SUMMARY

In some embodiments, a storage system comprises a plurality of storage devices that are configured to store data pages. The data pages are distributed across the plurality of storage devices in a plurality of data stripes. A first storage device of the plurality of storage devices comprises a first processing device. The storage system further comprises a storage controller comprising a second processing device. The second processing device of the storage controller is configured, based at least in part on a failure of a second storage device of the plurality of storage devices, to identify a data stripe of the plurality of data stripes that corresponds to a given data page that was stored on the failed second storage device and to provide an indication of the identified data stripe to the first storage device. The first processing device of the first storage device is configured, based at least in part on the provided indication, to obtain data pages corresponding to the identified data stripe from at least one storage device of the plurality of storage devices other than the failed second storage device to perform a parity calculation based at least in part on the obtained data pages to rebuild the given data page and to store the rebuilt given data page on a third storage device of the plurality of storage devices.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
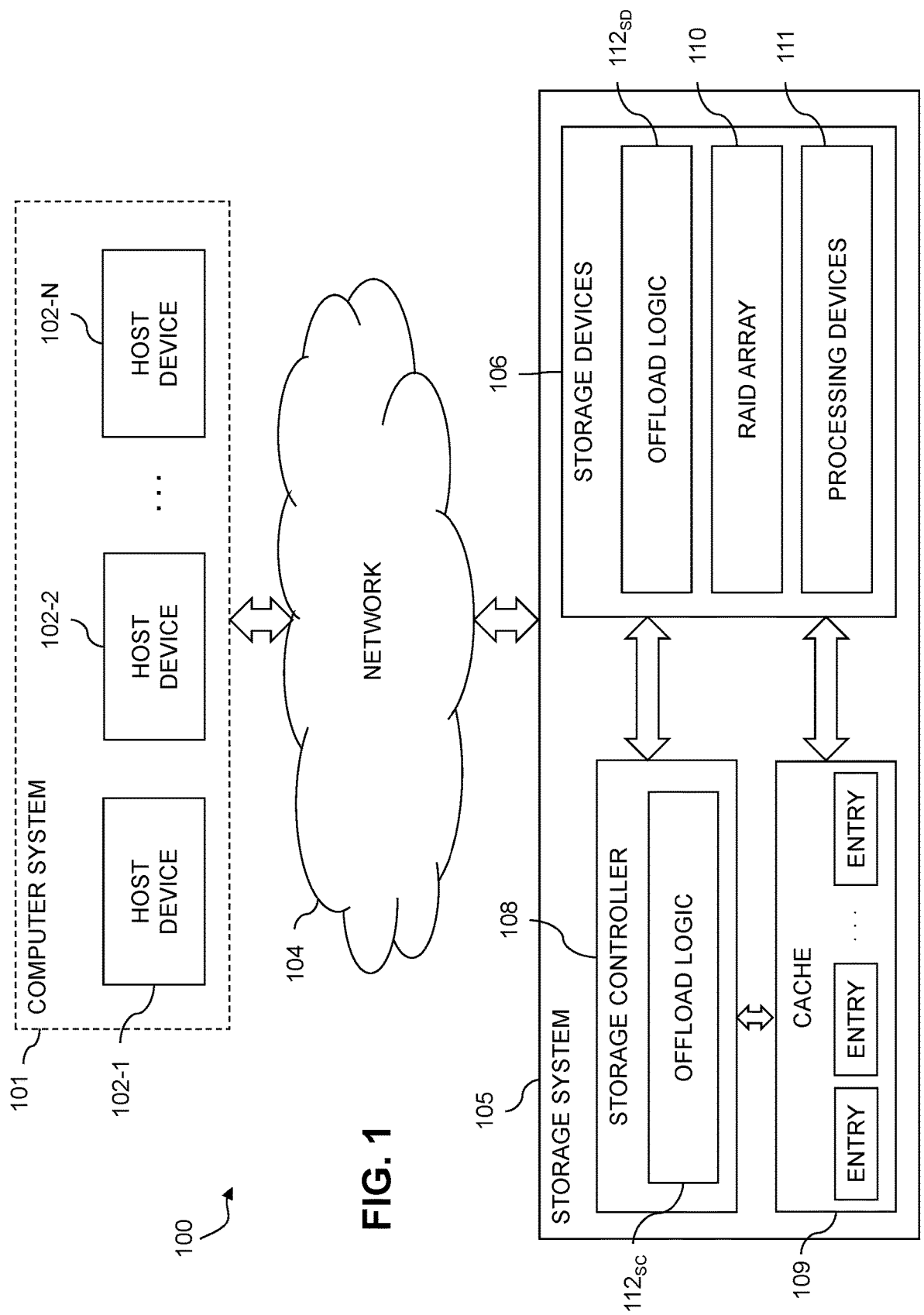
FIG. 1 is a block diagram of one example of an information processing system within which one or more illustrative embodiments are implemented.

FIG. 1 shows an information processing system 100 configured in accordance with an illustrative embodiment. The information processing system 100 comprises a computer system 101 that includes host devices 102-1, 102-2, . . . 102-N collectively referred to as host devices 102. The host devices 102 communicate over a network 104 with a storage system 105. The computer system 101 is assumed to comprise an enterprise computer system, cloud-based computer system or other arrangement of multiple compute nodes associated with respective users. The host devices 102 of the computer system 101 in some embodiments illustratively provide compute services such as execution of one or more applications on behalf of each of one or more users associated with respective ones of the host devices 102.

The host devices 102 and storage system 105 illustratively comprise respective processing devices of one or more processing platforms. For example, the host devices 102 and the storage system 105 can each comprise one or more processing devices each having a processor and a memory, possibly implementing virtual machines and/or containers, although numerous other configurations are possible.

The host devices 102 and the storage system 105 can additionally or alternatively be part of cloud infrastructure such as an Amazon Web Services (AWS) system. Other examples of cloud-based systems that can be used to provide one or more of host devices 102 and the storage system 105 include Google Cloud Platform (GCP) and Microsoft Azure.

The host devices 102 are configured to write data to and read data from the storage system 105. The host devices 102 and the storage system 105 may be implemented on a common processing platform, or on separate processing platforms. A wide variety of other types of host devices can be used in other embodiments.

The host devices 102 in some embodiments illustratively provide compute services such as execution of one or more applications on behalf of each of one or more users associated with the host devices 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage system 105 is accessible to the host devices 102 over the network 104. The storage system 105 comprises a plurality of storage devices 106, an associated storage controller 108 and an associated cache 109.

The storage devices 106 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. In illustrative embodiments, at least some of the storage devices 106 comprise processing devices 111 that each comprise processing resources such as, e.g., processors, memory, processing circuitry, or other similar processing resources. As an example, in some embodiments, at least some of the storage devices 106 may comprise non-volatile memory express (NVMe) or NVMe over fabric (NVMeOF) storage devices that comprise such processing resources.

It is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the storage system 105 illustratively comprises a scale-out all-flash content addressable storage array such as an XtremIO™ storage array commercially available from Dell EMC. Other types of storage arrays, including by way of example VNX®, Symmetrix VMAX®, Unity™ or PowerMax™ storage arrays, also commercially available from Dell EMC, can be used to implement one or both of storage systems 105 in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage system 105 in illustrative embodiments include all-flash and hybrid flash storage arrays such as Unity™ software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

In the FIG. 1 embodiment, the storage devices 106 implement a RAID array 110. The RAID array 110 is assumed to store data in stripes across a plurality of the storage devices 106. The RAID array 110 is an example of what is more generally referred to herein as data striping across a plurality of storage devices in a storage system.

The cache 109 of storage system 105 includes cache entries which store incoming IO request data for later destaging to storage devices 106. Cache 109 may illustratively comprise volatile memory such as, e.g., random access memory (RAM), dynamic random-access memory (DRAM), static random-access memory (SRAM), or any other kind of volatile memory. In some embodiments, cache 109 may additionally or alternatively comprise any non-volatile memory as described above with respect to storage devices 106. In some embodiments, cache 109 may support a variety of operations or functions of storage system 105 including, for example, write cache, read cache, temporary metadata storage, or other similar operations. While illustrated as a separate component of storage system 105, in some embodiments, cache 109 may be included as a component of storage controller 108.

The host devices 102 and storage system 105 should also be understood to include additional modules and other components typically found in conventional implementations of computers, servers or other host devices, although such additional modules and other components are omitted from the figure for clarity and simplicity of illustration.

The host devices 102 and storage system 105 in the FIG. 1 embodiment are assumed to be implemented using at least one processing platform each comprising one or more processing devices each having a processor coupled to a memory. Such processing devices can illustratively include particular arrangements of compute, storage and network resources.

The host devices 102 and the storage system 105 may be implemented on respective distinct processing platforms, although numerous other arrangements are possible. For example, in some embodiments at least portions of the host devices 102 and the storage system 105 are implemented on the same processing platform. The storage system 105 can therefore be implemented at least in part within at least one processing platform that implements at least a portion of the host devices 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the host devices 102 and storage system 105 to reside in different data centers. Numerous other distributed implementations of one or both of the host devices 102 and the storage system 105 are possible. Accordingly, the storage system 105 can also be implemented in a distributed manner across multiple data centers.

Additional examples of processing platforms utilized to implement host devices and/or storage systems in illustrative embodiments will be described in more detail below in conjunction with FIGS. 5-7.

It is to be appreciated that these and other features of illustrative embodiments are presented by way of example only, and should not be construed as limiting in any way.

Accordingly, different numbers, types and arrangements of system components such as host devices 102, network 104, storage system 105, storage devices 106, storage controller 108, cache 109, and RAID array 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. Additional examples of systems implementing functionality for offloading data recovery operations of the RAID array from the storage controller 108 to the processing devices 111 of the storage devices 106 will be described below.

Illustrative data striping operations in accordance with RAID based techniques will now be described in further detail in the context of the information processing system 100. However, it is to be understood that data striping operations are more generally applicable to other types of information processing systems. At least some of steps are illustratively performed under the control of a storage controller 108 of system 100.

Data striping in some embodiments is implemented utilizing a RAID scheme, such as via RAID array 110 implemented on the storage devices 106 of the storage system 105. In such embodiments, the number of data disks in the RAID storage system may comprise a prime number k, and a column of the RAID storage system comprises k−1 blocks.

The storage devices of the RAID storage system may comprise SSDs or any other type of storage devices. In some embodiments, the RAID storage system may implement RAID 6 with the number of data disks being k and the number of parity disks being n, where n is greater than one (e.g., where n=2). In some embodiments, the stripe column size is selected as a multiple of a designated block size. The multiple may be a prime number P minus 1. The prime number P may be the same as or different than the prime numbers selected for different ones of the stripes.

In some cases, the prime number selected for a particular stripe may be greater than a number of the plurality of storage devices in the storage system that store data blocks for that stripe. To handle such situations, the parity blocks for the stripe may be computed by assuming or setting a set of virtual storage devices with pages storing designated predetermined values (e.g., zero pages). The particular number of virtual storage devices in the set may be equal to the difference between the prime number selected for that stripe and the number of storage devices in the storage system which store data blocks for that stripe.

The term RAID, as used herein, is an umbrella term for computer data storage schemes that can divide and replicate data among multiple physical disk drives. The terms disks, drives and storage devices will be used interchangeably henceforth. The physical disks are said to be in a RAID array, which is accessed by an operating system as one single disk. The different schemes or architectures are named by the word RAID followed by a number (e.g., RAID 0, RAID 1, etc.). Each scheme provides a different balance between the goals of increasing data reliability and increasing input/output performance.

The RAID 6 scheme was developed to provide functionality for recovering from multiple disk failure (e.g., similar to RAID 1.3) with high utilization rates (e.g., comparable to RAID 4 and 5) that avoids system bottlenecks. RAID 6 uses an N+2 parity scheme, which allows failure of two disks, where N is the number of disks in the array. RAID 6 defines block-level striping with double distributed parity and provides fault tolerance of two drive failures, so that the array continues to operate with up to two failed drives, irrespective of which two drives fail.

There are various implementations of RAID 6, which may use varying coding schemes. As the term is used herein, RAID 6 is defined as any N+2 coding scheme which tolerates double disk failure, while user data is kept in the clear. This additional requirement assures that user reads are not affected by the RAID scheme under normal system operation.

Examples of RAID 6 schemes include those that utilize the Reed Solomon error correction code and those that utilize parity bits, such as those wherein N data disks are supported by two redundancy disks each holding a different parity bit. It should be noted that if all parity bits are on the same two disks, then the performance may be subject to bottlenecks. This can be solved by use of distributed parity stripes over N+2 disks similar to that specified in RAID 5. Examples of coding schemes based on parity calculations of rows and diagonals in a matrix of blocks include Even/Odd and Row Diagonal Parity (RDP). Both of these schemes utilize a first parity disk "P" that holds the parities of rows of blocks as well as a second parity disk "Q" that contains blocks that hold the parity of diagonals of data blocks. In both schemes, it is advantageous to work with a block size that is smaller than the native page size. For example, the native page size may be 8 kilobytes (KB), while the block size is smaller but evenly divisible into 8 KB, e.g., 0.5 KB, 1 KB, 2 KB, 4 KB. In an example where the native page size is 8 KB and the block size is 2 KB, each stripe thus may contain four rows, and thus the four blocks present on each disk form a single native page. However, a stripe can also be defined by multiple rows of blocks distributed across the storage devices of the RAID array. It is assumed that pages are read and written using a single disk operation.

Figure 2:
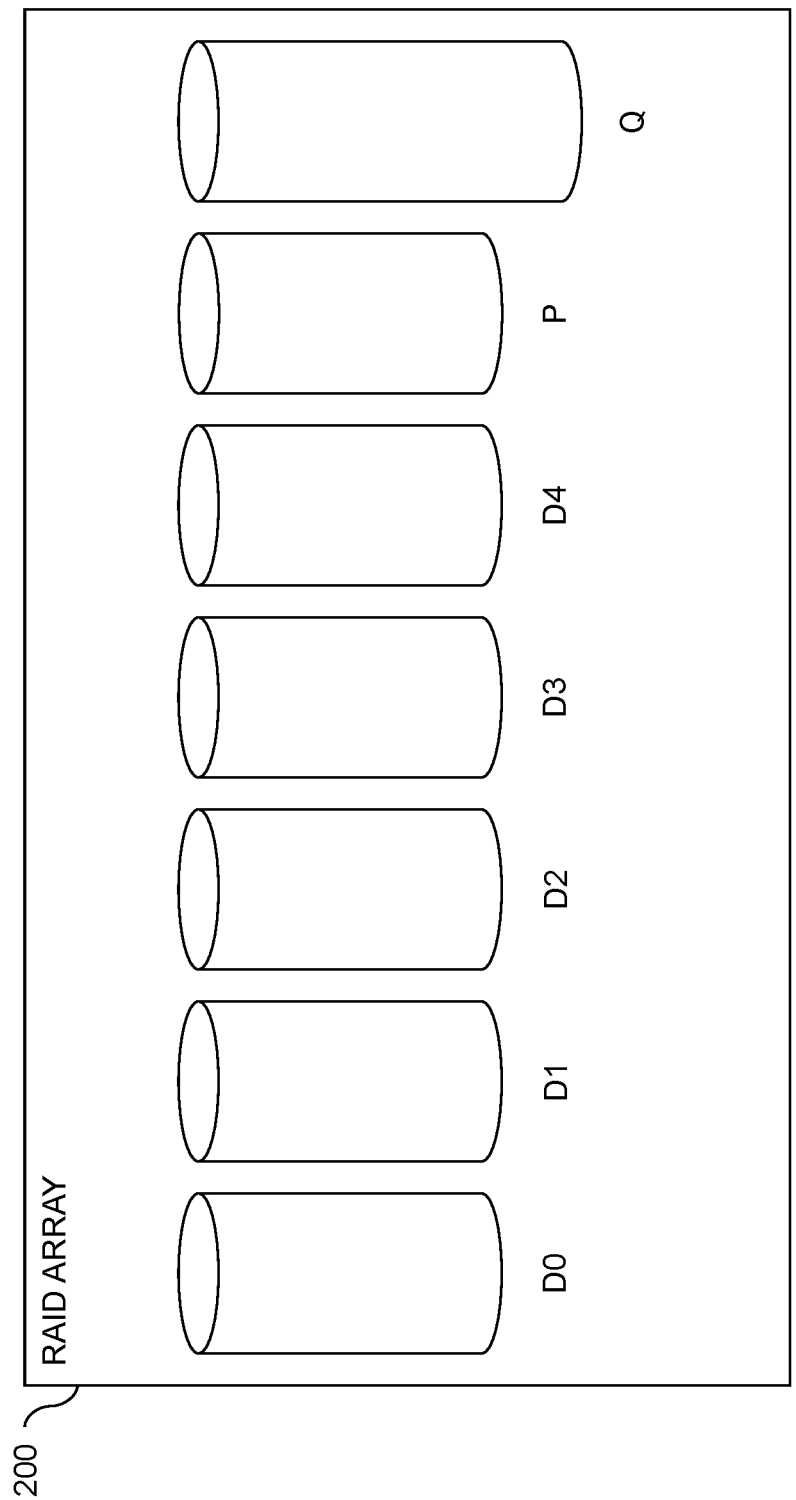
FIG. 2 is a block diagram illustrating an example of a RAID 6 array for implementation in the FIG. 1 system.

FIG. 2 shows a RAID array 200 stored on storage devices 106, which in this example includes five data disks denoted D0 through D4. A storage controller 108 is configured for writing initial data into the array 200, and for updating existing data in the array 200. The storage controller further provides functionality for recovering data after single or double disk failure. In illustrative embodiments, at least some of the functionality for recovering data after a single or double disk failure may be offloaded to the processing devices 111 of the storage devices 106.

Each of the disks in the array 200 stores a column of data blocks. The same data block in successive disks forms a row, which is to say the rows cross the disks. The data storage blocks are stored alongside parity data blocks in parity disks denoted P and Q, and the number of data blocks in the different columns or disks may be different. Row parity blocks are placed in a row parity column in disk P, and the diagonal parity data is placed in diagonal parity blocks in disk Q.

In the case of five data columns and four data rows, the number of diagonals is one greater than the number of rows. Thus, the diagonal parity column in disk Q includes one more block than the other columns for disks D0 through D4 and the row parity disk P. This is illustrated in FIG. 2 as Q is "taller" than D0 through D4 and P.

The number of data columns is a prime number, and the number of rows is one less than that prime number (e.g., in the FIG. 2 example the prime number is 5, which corresponds to the five data disks D0 through D4). It should be noted that, in practice, the various columns are distributed over the available physical disks to avoid system bottlenecks.

Figure 3:
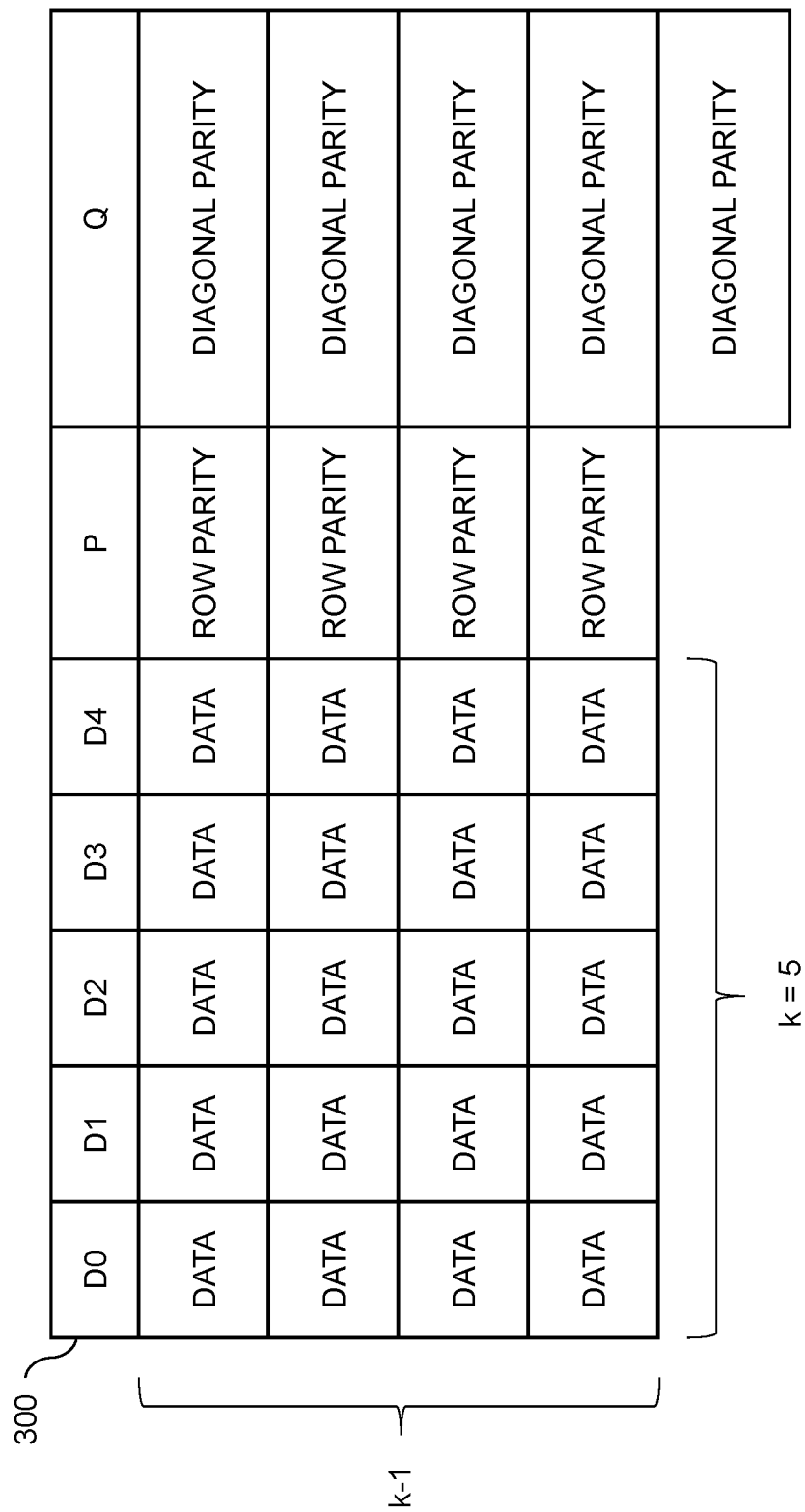
FIG. 3 is a table showing distribution of data blocks in the FIG. 2 RAID 6 array.

FIG. 3 shows a table 300 illustrating one example distribution of data blocks in the RAID array 200. In this example, there are k data disks, where k=5 is a prime number, and there are five data columns corresponding to disks D0 through D4. There are four rows (e.g., k−1). The P column includes the same four rows as the data columns D0 through D4, but the Q column has an extra row.

In one example, each stripe is considered to contain k (where k must be prime) data columns D0 through D4, and two parity columns P and Q. The stripe is composed of a quasi-matrix of blocks, which contain k−1 rows. Column P contains k−1 blocks, each providing the parity of the k data disk blocks in its row. The k by k−1 matrix made up of the blocks in the data columns includes k diagonals each of size k−1. Column Q, in contrast with the rest of the columns, contains k blocks and not k−1. Each of the k blocks in disk Q holds the parity of one of the diagonals. It should be noted that the ordering of blocks within each column may be arbitrary. Furthermore, the extra block in column Q may be placed in a data column which does not contain a data block in the diagonal of which this block is the parity. Also, some of the rows may be blank.

It should be appreciated that there are various other ways to distribute data blocks in an array such as RAID array 200. For example, in some cases it may be desired to provide more than one row parity column, which results in higher capacity overhead but which allows for a faster rebuild after a single disk failure.

Additional details regarding the above-described techniques for storing data in RAID arrays are disclosed in U.S. Pat. No. 9,552,258, entitled "Method and System for Storing Data in RAID Memory Devices," which is incorporated by reference herein.

A storage system that uses a RAID parity protection scheme such as that described above has the ability to recover from single or double storage device failures. In order to recover a data block that was stored on a failed storage device, the recovery calculation may require a read of the data of the corresponding row or diagonal blocks from the healthy storage devices of the corresponding stripe, e.g. the row or diagonal stripe where the data block was stored, and perform a bitwise exclusive or (XOR) operation on the read data.

Two example scenarios that require the recovery of data blocks after a storage device failure will now be described.

In the first example scenario, a client application executing on a host device 102 issues a read IO operation to the storage system 105 that requests a read of a data block stored on a storage device 106 that has failed. Since the storage device 106 has failed, the data block must be recovered and rebuilt before the response to the read IO operation can be returned to the host device 102 with the corresponding data. As mentioned above, recovery of the data block may require a reading of the data blocks in the corresponding row or diagonal stripe of the RAID scheme. Such a read IO operation that requests a data block stored on a failed storage device 106 is often referred to as a degraded read since the read operation is delayed by the need to rebuild the data block.

In the second example scenario, the storage controller 108 of the storage system 105 may initiate a background data recovery process in response to a failure of a storage device 106. The background data recovery process iterates over each horizontal or diagonal stripe of data associated with the failed storage device and reconstructs all of the missing data blocks for the failed storage device 106. The reconstructed data blocks may be written to a healthy storage device 106, e.g., a storage device 106 that is replacing the failed storage device 106 in some embodiments.

During storage device failure, and until the rebuild process is complete, every client application issued read IO operation for data that was stored on the failed storage device 106 but has not yet been recovered by the background data recovery process will cause a large number of IO operations to be sent to the storage system 105. This is because in order for the data associated with the read IO operation to be read from the storage devices 106, the data of the corresponding stripe of the RAID scheme that is found on the other healthy storage devices 106 needs to be obtained by the storage controller 108 and a bitwise XOR calculation needs to be performed by the storage controller 108 to recover the requested data blocks. Together with the data recovery process itself running in the background by the storage controller 108, the storage system 105 may experience a heavy load of calculations and increased bandwidth usage between the storage controller 108 and the storage devices 106. The excessive use of such system resources can cause significant delays in processing and responding to IO operations that degrades the system performance and may also lead to IO timeouts and host failures.

In order to improve the system performance and stability during the degraded state, the disclosed offload functionality offloads at least part of the data recovery processing to the processing devices 111 of the storage devices 106 themselves. For example, in some embodiments, the processing devices 111 of the storage devices 106 themselves obtain any relevant data and perform the XOR operation to rebuild the data of the failed storage device 106 with the assistance of the storage controller 108 for performing these calculations.

In illustrative embodiments, at least some of the storage devices 106 incorporate processing devices 111 and functionality that enables them to directly access the other storage devices 106 without requiring the involvement of the storage controller 108. Examples of such storage devices 106 may comprise NVMe Ethernet drives or NVMe P2P DMA NVMe drives. By enabling the storage devices 106 to perform the data recovery operations and directly communicate with the other storage devices 106 of the storage system 105 without requiring the storage controller 108 to act as an intermediary, a significant reduction in the processing cycle usage of the storage controller 108 and the IO bandwidth usage between the storage controller 108 and the storage devices 106 for data recovery operations may be achieved.

Since the latency in responding to and servicing client application IO operations can be highly critical as compared to background data recovery operations, consuming processing resources of the storage controller 108 for data recovery operations associated with rebuilding the RAID array or the rebuilding of data blocks for handling degraded read IO operations in the event of a storage device failure may be inefficient. In illustrative embodiments, offload logic $112_{SC}$ and $112_{SD}$, also collectively referred to herein as offload logic 112, comprises functionality for offloading the data recovery operations and the rebuilding of data blocks for handling degraded read IO operations is disclosed. The offload logic $112_{SC}$ may be implemented by storage controller 108 and the offload logic $112_{SD}$ may be implemented by storage devices 106. In some embodiments, offload logic 112 may be implemented only as offload logic $112_{SC}$, only as offload logic $112_{SD}$ or implemented in part by offload logic $112_{SC}$ on the storage controller 108 and in part by offload logic $112_{SD}$ on the storage devices 106. As an example, the portion of offload logic 112 executing on storage controller 108, e.g., offload logic $112_{SC}$, may be configured to issue a command to the portion of offload logic 112 executing on one or more of the storage devices 106, e.g., offload logic $112_{SD}$, to perform data recovery operations or to rebuild particular data blocks for a degraded read IO operation.

A data recovery operation performed by offload logic 112 for rebuilding the data pages of a failed storage device 106 according to a first illustrative embodiment will now be described. While described below with reference to data pages, in some embodiments, the offload logic 112 may also or alternatively be configured to rebuild the individual data blocks of the data pages in the manner described below.

In response to a failure of a storage device 106, the offload logic $112_{SC}$ of the storage controller 108 is configured to iterate over the stripes of the RAID array 110 and identify the column of the data pages that were stored on the failed storage device 106. For each stripe of the RAID array 110, the offload logic $112_{SC}$ iterates over the corresponding data pages in the identified column for that stripe to identify the data pages that need to be rebuilt for that stripe. In illustrative embodiments, each data page will be recovered by the processing device 111 of a single storage device 106.

The data recovery operation is distributed across some or all of the storage devices 106 in an attempt to balance the processing load since the rebuild needs to recover a large number of data pages from the column of the failed storage device 106. In some embodiments, the storage device 106 for rebuilding each data page may be selected by the offload logic $112_{SC}$ of the storage controller 108 based at least in part on the stripe index and the row index of the data page to be recovered. For example, in some embodiments, the storage device 106 that will perform the rebuild of a particular data page may be selected according to equation (1) below:

Selected storage device=(stripe index+row index) modulo num_of_drives    (1)

Where num_of_devices is the number of storage devices 106 that are part of the RAID array 110 including any replacement storage device 106. By distributing the rebuilding of the data pages across the storage devices 106 using the above equation, a load balancing of the storage device usage in the storage system may be maintained.

In some embodiments, since part of the data recovery operation the rebuilt data page is written to a healthy storage device 106, the selected storage device 106 may comprise the storage device 106 to which the recovered data page will eventually be written. Such an optimization may avoid the need to perform an additional copy operation to move the rebuilt data page from one of the storage devices 106 to the final destination storage device 106.

The offload logic $112_{SC}$ of the storage controller 108 is configured to send a command to the chosen storage device 106 with the information for the data page recovery. The information may comprise, for example, a list of (disk id, offset) pairs of the data pages of the row or diagonal of the required data page and a destination location for the result. If the above optimization is used to select the storage device which is the destination location, the selected storage device will be the final location of the recovered data page.

A data recovery operation performed by offload logic 112 for rebuilding a data page of a failed storage device 106 for servicing a degraded read IO operation according to a second illustrative embodiment will now be described.

To achieve optimized latency for degraded read IO operations, an alternative distributed algorithm for the data recovery operations may be implemented.

When a data page needs to be recovered for a synchronous operation such as, e.g., a client application read IO operation, two healthy storage devices 106, e.g., storage devices A and B, will be selected to perform the data recovery operation to rebuild that data page. In this embodiment, the data recovery operation will be split between the selected storage devices 106. One of the storage devices 106 (e.g., storage device A) will be the 'master' storage device that is responsible for reconstructing the final recovered data page.

For example, in some embodiments, storage device A will read half of the data pages and calculate the bitwise XOR of them. Similarly, storage device B will read the other half of the data pages and calculate the bitwise XOR. The master storage device, i.e., storage device A, will read the result from storage device B and calculate the bitwise XOR of the two results to construct the data page. The reconstructed data page may then be provided to the storage controller 108 which may respond to the read IO operation with the data of the reconstructed data page.

For load balancing purposes, the storage controller 108 may keep track of the inflight operations for each storage device 106 and select the two storage devices 106 from a pool of storage drives that are underutilized. In some embodiments, the two least utilized storage devices 106 may be selected as the storage devices A and B.

Offload logic 112 may be configured to interface between the storage controller 108 and the storage devices 106. For example, the offload logic $112_{SC}$ of the storage controller 108 may be configured to send a command to each of the selected storage devices with the required information for the rebuilding of the data page that is the target of the read IO operation. The command may comprise, for example, a list of (disk id, offset) pairs of the data pages of the row or diagonal that are required to rebuild the data page that is the target of the read IO operation. In illustrative embodiments, the command submitted to storage device A may comprise information on a corresponding half of the data pages of the row or diagonal that are needed for rebuilding the data page while the command submitted to storage device B may comprise information on a corresponding other half of the data pages of the row or diagonal that are needed for rebuilding the data page.

The command may also comprise a destination location for the rebuilt data page. For example, the destination location may comprise the storage controller 108, the master storage device 106, e.g., storage device A, or another storage device 106 that will be utilized to replace the failed storage device 106.

The command may also comprise a flag or other indication that indicates if the storage device 106 is the master storage device 106. If this flag is set, e.g., to a value indicating that this storage device 106 is the master storage device 106, a location of the recovery result of the other storage device 106 will also be provided. The master storage device 106 may then obtain the XOR result of the other half the data pages from the indicated location and complete the rebuilding of the data page that is the target of the read IO operation, for example, by performing an XOR calculation on the results of both halves.

In order to achieve optimized latency for degraded read IO operations, the algorithm with the shorter latency may be selected by the storage controller 108. For example, for a RAID array 110 comprising 24 storage devices and stripes that span all of the storage devices 106, the first illustrative embodiment may have a read latency that is based on the time it takes to read the 23 remaining data pages of the stripe, e.g., each data page aside from the data page stored on the failed storage device 106, and perform of an XOR calculation of the 23 data pages. On the other hand, the second illustrative embodiment may have a read latency equal to the time it takes the master storage device 106, e.g., storage device A, to read approximately half of the total number of pages, e.g., 11 data pages in this example, perform an XOR calculation of the 11 data pages to generate a result page, read the data page provided by storage node B that is the XOR result of the remaining data pages, e.g., 12 data pages in this example, and calculate the XOR result on the two result data pages to rebuild the data page that is the target of the read IO operation.

In illustrative embodiments, depending on the storage system load, if the fabric transfer time between the two storage devices A and B, e.g., memory to memory via dma/rdma, is faster than the full XOR calculation of the 23 data pages, the algorithm of the second illustrative embodiment may be utilized for reconstructing the data page that is the target of the read IO operation. Otherwise, the algorithm of the first illustrative embodiment may be selected.

The algorithm in the second illustrative embodiment may be further optimized in some embodiments. For example, in this embodiment, the master storage device A doesn't have to wait for the entire result page of storage device B to be completed. Instead, storage device B may alternatively notify storage device A of the completion of one or more partial XOR calculations. For example, storage device B may notify storage device A for, e.g., every 64 bytes of completed XOR calculations. Storage device A may then utilize these partial XOR results to being processing the final XOR calculation. By running both of the XOR calculations in a semi-parallel or slightly staggered manner, the latency associated with waiting for the full result data page to be completed by storage device B may be substantially avoided thereby reducing the overall latency associated with the rebuild operation. In some cases, this optimization can be achieved by having storage device B write its partial results to the memory of the master storage device A and then providing a notification to the master storage device A that indicates that the particular partial result is ready for further processing.

In some example embodiments, further latency improvement may be achieved by splitting the data recovery operation among one or more additional storage devices of the RAID array 110. For example, in addition to the master storage device A, any number of additional storage devices 106 of the RAID array 110 may be utilized to perform the partial XOR calculations on the data pages. For example, the data pages of the corresponding stripe may be split according to the number of storage devices 106 being utilized for the XOR calculations. By distributing the XOR calculations among more storage devices, more XOR operations may be performed in parallel which reduces the latency required to service the degraded read IO operation.

By utilizing the offload logic 112 in the above illustrative embodiments, significant processing resources of the storage controller 108 or bandwidth of the storage system 105 may be freed up for use in servicing other IO operations or performing other storage system operations which may reduce the read latency of IO operations submitted to the storage system 105 and improve the overall storage system performance and stability.

Figure 4:
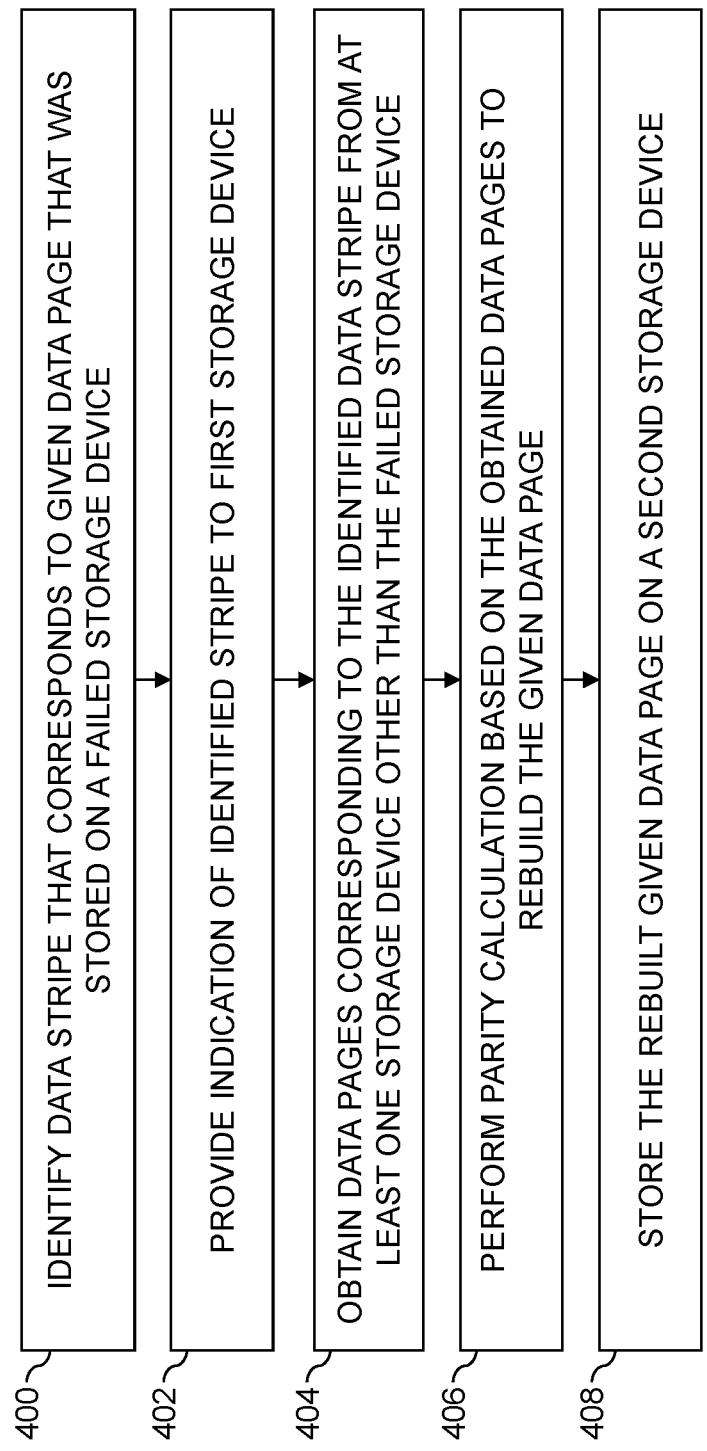
FIG. 4 is a flow diagram illustrating part of a methodology for offloading data recovery operations in an illustrative embodiment.

FIG. 4 is a flow diagram illustrating an example process for offloading data recovery operations based on an execution of offload logic $112_{SC}$ by a storage controller 108 and an execution of offload logic $112_{SC}$ by a processing device 111 of a storage device 106 in an illustrative embodiment.

At step 400, the offload logic $112_{SC}$ executing on the storage controller 108 identifies a data stripe of the plurality of data stripes that corresponds to a given data page that was stored on a failed storage device.

At step 402, the offload logic $112_{SC}$ executing on the storage controller 108 provides an indication of the identified data stripe to a first storage device.

At step 404, the offload logic $112_{SD}$ executing on the processing device 111 of the storage device 106 obtains data pages corresponding to the identified data stripe from at least one storage device of the plurality of storage devices other than the failed storage device.

At step 406, the offload logic $112_{SD}$ executing on the processing device 111 of the storage device 106 performs a parity calculation based at least in part on the obtained data pages to rebuild the given data page At step 408, the offload logic $112_{SD}$ executing on the processing device 111 of the storage device 106 stores the rebuilt given data page on a second storage device of the plurality of storage devices.

It is to be understood that for any methodologies described herein, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes for different storage systems or for different RAID arrays or other data striping schemes on a particular storage system or systems.

Functionality such as that described herein can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, the storage controller 108 or storage devices 106 that are configured to control performance of one or more steps described herein can be implemented as part of what is more generally referred to herein as a processing platform comprising one or more processing devices each comprising a processor coupled to a memory. Such processing devices are to be distinguished from processing devices referred to herein with respect to the processing capabilities of the SSDs. In the case of a host device or storage controller, a given such processing device may correspond to one or more virtual machines or other types of virtualization infrastructure such as Docker containers or Linux containers (LXCs). The storage controller 108 or storage devices 106, as well as other system components, may be implemented at least in part using processing devices of such processing platforms. For example, in a distributed implementation of the storage controller 108, respective distributed modules of such a storage controller can be implemented in respective containers running on respective ones of the processing devices of a processing platform.

In some embodiments, the storage system comprises an XtremIO™ storage array or other type of content addressable storage system suitably modified to incorporate functionality for offloading data recovery operations as disclosed herein.

An illustrative embodiment of such a content addressable storage system will now be described with reference to FIG. 5. In this embodiment, a content addressable storage system 505 comprises a plurality of storage devices 506, an associated storage controller 508, and an associated cache 509. The content addressable storage system 505 may be viewed as a particular implementation of the storage system 105, and accordingly is assumed to be coupled to host devices 102 of computer system 101 via network 104 within information processing system 100.

The storage controller 508 in the present embodiment is configured to implement functionality for offloading data recovery operations of the type previously described in conjunction with FIGS. 1 through 4.

The storage controller 508 and storage devices 506 include offload logic $512_{SC}$ and $512_{SD}$, respectively, which are configured to operate in a manner similar to that described above for the corresponding offload logic $112_{SC}$ and $112_{SD}$.

The cache 509 is configured to operate in a manner similar to that described above for cache 109.

Figure 5:
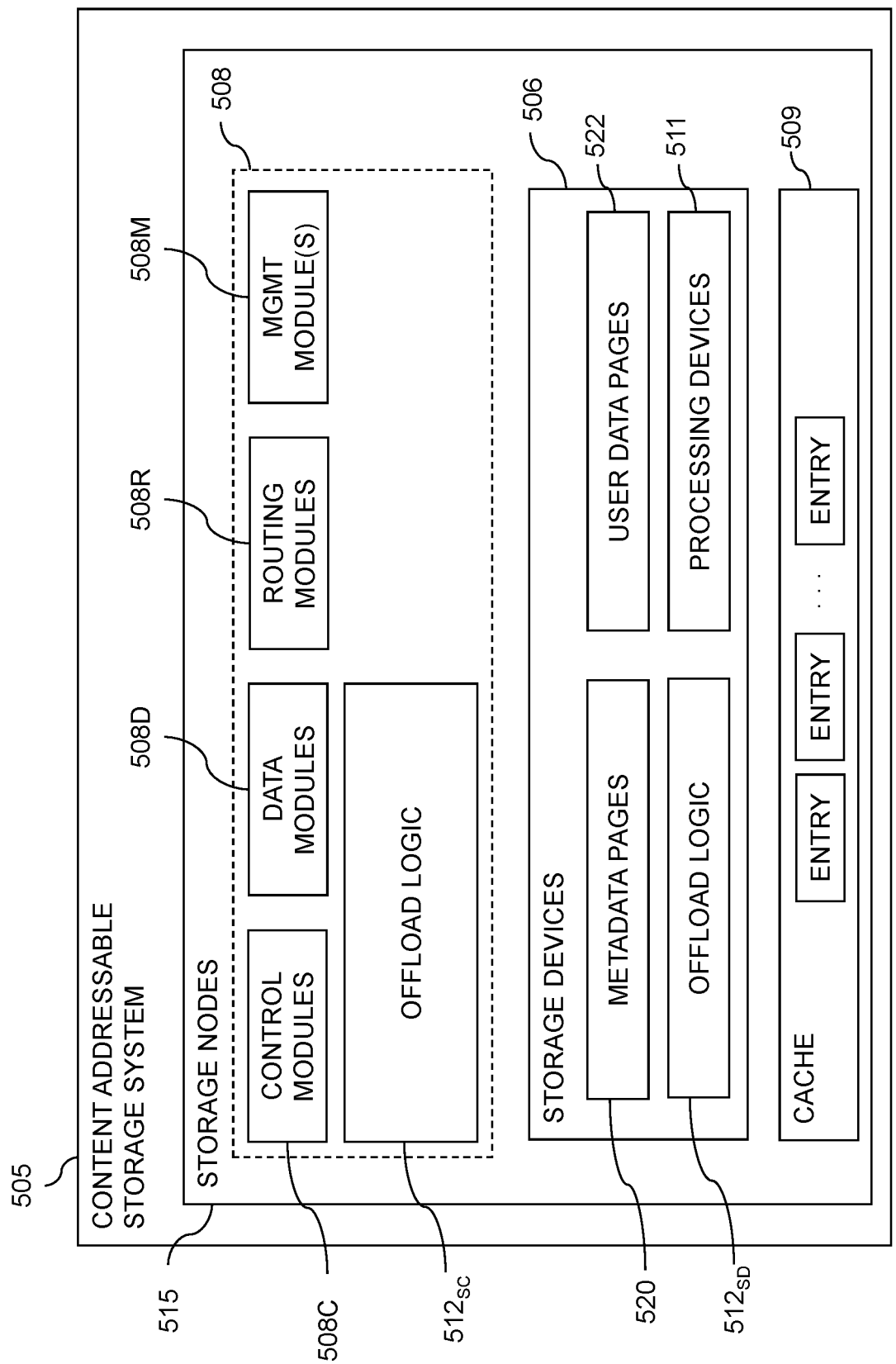
FIG. 5 shows a content addressable storage system having a distributed storage controller configured with functionality for offloading data recovery operations in an illustrative embodiment.

The content addressable storage system 505 in the FIG. 5 embodiment is implemented as at least a portion of a clustered storage system and includes a plurality of storage nodes 515 each comprising a corresponding subset of the storage devices 506. Other clustered storage system arrangements comprising multiple storage nodes can be used in other embodiments. A given clustered storage system may include not only storage nodes 515 but also additional storage nodes coupled via a storage network. Alternatively, such additional storage nodes may be part of another clustered storage system of the system 100. Each of the storage nodes 515 of the storage system 505 is assumed to be implemented using at least one processing device comprising a processor coupled to a memory.

The storage controller 508 of the content addressable storage system 505 is implemented in a distributed manner so as to comprise a plurality of distributed storage controller components implemented on respective ones of the storage nodes 515. The storage controller 508 is therefore an example of what is more generally referred to herein as a "distributed storage controller." In subsequent description herein, the storage controller 508 may be more particularly referred to as a distributed storage controller.

Each of the storage nodes 515 in this embodiment further comprises a set of processing modules configured to communicate over one or more networks with corresponding sets of processing modules on other ones of the storage nodes 515. The sets of processing modules of the storage nodes 515 collectively comprise at least a portion of the distributed storage controller 508 of the content addressable storage system 505.

The modules of the distributed storage controller 508 in the present embodiment more particularly comprise different sets of processing modules implemented on each of the storage nodes 515. The set of processing modules of each of the storage nodes 515 comprises at least a control module 508C, a data module 508D and a routing module 508R. The distributed storage controller 508 further comprises one or more management ("MGMT") modules 508M. For example, only a single one of the storage nodes 515 may include a management module 508M. It is also possible that management modules 508M may be implemented on each of at least a subset of the storage nodes 515.

Each of the storage nodes 515 of the storage system 505 therefore comprises a set of processing modules configured to communicate over one or more networks with corresponding sets of processing modules on other ones of the storage nodes. A given such set of processing modules implemented on a particular storage node illustratively includes at least one control module 508C, at least one data module 508D and at least one routing module 508R, and possibly a management module 508M. These sets of processing modules of the storage nodes collectively comprise at least a portion of the distributed storage controller 508.

Communication links may be established between the various processing modules of the distributed storage controller 508 using well-known communication protocols such as IP, Transmission Control Protocol (TCP), and remote direct memory access (RDMA). For example, respective sets of IP links used in data transfer and corresponding messaging could be associated with respective different ones of the routing modules 508R.

Although shown as a separate logic of the distributed storage controller 508 and storage devices 506, the offload logic 512 in the present embodiment is assumed to be distributed at least in part over at least a subset of the other modules 508C, 508D, 508R and 508M of the storage controller 508 and the processing devices 511 of the storage devices 506. Accordingly, at least portions of the functionality of the offload logic 512 may be implemented in one or more of the other modules of the storage controller 508 or by the storage devices 506. In other embodiments, the offload logic 512 may be implemented as a stand-alone module of the storage controller 508 or a stand-alone module of one or more of the storage devices 506.

The storage devices 506 are configured to store metadata pages 520 and user data pages 522 and may also store additional information not explicitly shown such as checkpoints and write journals. The storage devices 506 also comprise processing devices 511 and offload logic $512_{SD}$ that function in a similar manner to processing devices 111 and offload logic $112_{SD}$ as described above. The metadata pages 520 and the user data pages 522 are illustratively stored in respective designated metadata and user data areas of the storage devices 506. Accordingly, metadata pages 520 and user data pages 522 may be viewed as corresponding to respective designated metadata and user data areas of the storage devices 506.

A given "page" as the term is broadly used herein should not be viewed as being limited to any particular range of fixed sizes. In some embodiments, a page size of 8 KB is used, but this is by way of example only and can be varied in other embodiments. For example, page sizes of 4 KB, 16 KB or other values can be used. Accordingly, illustrative embodiments can utilize any of a wide variety of alternative paging arrangements for organizing the metadata pages 520 and the user data pages 522.

The user data pages 522 are part of a plurality of logical units (LUNs) configured to store files, blocks, objects or other arrangements of data, each also generally referred to herein as a "data item," on behalf of users associated with host devices 102. Each such LUN may comprise particular ones of the above-noted pages of the user data area. The user data stored in the user data pages 522 can include any type of user data that may be utilized in the system 100. The term "user data" herein is therefore also intended to be broadly construed.

The content addressable storage system 505 in the embodiment of FIG. 5 is configured to generate hash metadata providing a mapping between content-based digests of respective ones of the user data pages 522 and corresponding physical locations of those pages in the user data area. Content-based digests generated using hash functions are also referred to herein as "hash digests." The hash metadata generated by the content addressable storage system 505 is illustratively stored as metadata pages 520 in the metadata area. The generation and storage of the hash metadata is assumed to be performed under the control of the storage controller 508.

Each of the metadata pages 520 characterizes a plurality of the user data pages 522. For example, a given set of user data pages representing a portion of the user data pages 522 illustratively comprises a plurality of user data pages denoted User Data Page 1, User Data Page 2, . . . User Data Page n. It should be noted that usage of the variable n in this user data page context is unrelated to its usage elsewhere herein.

Each of the user data pages 522 in this example is characterized by a LUN identifier, an offset and a content-based signature. The content-based signature is generated as a hash function of content of the corresponding user data page. Illustrative hash functions that may be used to generate the content-based signature include the above-noted SHA1 hash function, or other secure hashing algorithms known to those skilled in the art. The content-based signature is utilized to determine the location of the corresponding user data page within the user data area of the storage devices 506.

Each of the metadata pages 520 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

A given set of metadata pages representing a portion of the metadata pages 520 in an illustrative embodiment comprises metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations described above are examples only, and numerous alternative user data and metadata page configurations can be used in other embodiments.

Ownership of a user data logical address space within the content addressable storage system 505 is illustratively distributed among the control modules 508C.

The functionality provided by offload logic 512 in this embodiment is assumed to be distributed across multiple distributed processing modules, including at least a subset of the processing modules 508C, 508D, 508R and 508M of the distributed storage controller 508 and the processing devices 511 of the storage devices 506.

For example, the management module 508M of the storage controller 508 may include logic that engages corresponding logic instances in some or all of the control modules 508C, routing modules 508R of the storage controller 508 and processing devices 511 of the storage devices 506 in order to implement processes for offloading data recovery operations.

In some embodiments, the content addressable storage system 505 comprises an XtremIO™ storage array suitably modified to incorporate techniques for offloading data recovery operations as disclosed herein.

In arrangements of this type, the control modules 508C, data modules 508D and routing modules 508R of the distributed storage controller 508 illustratively comprise respective C-modules, D-modules and R-modules of the XtremIO™ storage array. The one or more management modules 508M of the distributed storage controller 508 in such arrangements illustratively comprise a system-wide management module ("SYM module") of the XtremIO™ storage array, although other types and arrangements of system-wide management modules can be used in other embodiments. Accordingly, functionality for offloading data recovery operations in some embodiments is implemented under the control of at least one system-wide management module of the distributed storage controller 508, utilizing the C-modules, D-modules and R-modules of the XtremIO™ storage array.

In the above-described XtremIO™ storage array example, each user data page has a fixed size such as 8 KB and its content-based signature is a 20-byte signature generated using an SHA1 hash function. Also, each page has a LUN identifier and an offset, and so is characterized by <lun_id, offset, signature>.

The content-based signature in the present example comprises a content-based digest of the corresponding data page. Such a content-based digest is more particularly referred to as a "hash digest" of the corresponding data page, as the content-based signature is illustratively generated by applying a hash function such as SHA1 to the content of that data page. The full hash digest of a given data page is given by the above-noted 20-byte signature. The hash digest may be represented by a corresponding "hash handle," which in some cases may comprise a particular portion of the hash digest. The hash handle illustratively maps on a one-to-one basis to the corresponding full hash digest within a designated cluster boundary or other specified storage resource boundary of a given storage system. In arrangements of this type, the hash handle provides a lightweight mechanism for uniquely identifying the corresponding full hash digest and its associated data page within the specified storage resource boundary. The hash digest and hash handle are both considered examples of "content-based signatures" as that term is broadly used herein.

Examples of techniques for generating and processing hash handles for respective hash digests of respective data pages are disclosed in U.S. Pat. No. 9,208,162, entitled "Generating a Short Hash Handle," and U.S. Pat. No. 9,286,003, entitled "Method and Apparatus for Creating a Short Hash Handle Highly Correlated with a Globally-Unique Hash Signature," both of which are incorporated by reference herein.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules. For example, if there are 524 slices distributed evenly across the C-modules, and there are a total of 16 C-modules in a given implementation, each of the C-modules "owns" 1024/16=64 slices. In such arrangements, different ones of the slices are assigned to different ones of the control modules 508C such that control of the slices within the storage controller 508 of the storage system 505 is substantially evenly distributed over the control modules 508C of the storage controller 508.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Write requests processed in the content addressable storage system 505 each illustratively comprise one or more IO operations directing that at least one data item of the storage system 505 be written to in a particular manner. A given write request is illustratively received in the storage system 505 from a host device, illustratively one of the host devices 102. In some embodiments, a write request is received in the distributed storage controller 508 of the storage system 505 and directed from one processing module to another processing module of the distributed storage controller 508. For example, a received write request may be directed from a routing module 508R of the distributed storage controller 508 to a particular control module 508C of the distributed storage controller 508. Other arrangements for receiving and processing write requests from one or more host devices can be used.

The term "write request" as used herein is intended to be broadly construed, so as to encompass one or more IO operations directing that at least one data item of a storage system be written to in a particular manner. A given write request is illustratively received in a storage system from a host device.

In the XtremIO™ context, the C-modules, D-modules and R-modules of the storage nodes 515 communicate with one another over a high-speed internal network such as an InfiniBand network. The C-modules, D-modules and R-modules coordinate with one another to accomplish various IO processing tasks.

The write requests from the host devices identify particular data pages to be written in the storage system 505 by their corresponding logical addresses each comprising a LUN ID and an offset.

As noted above, a given one of the content-based signatures illustratively comprises a hash digest of the corresponding data page, with the hash digest being generated by applying a hash function to the content of that data page. The hash digest may be uniquely represented within a given storage resource boundary by a corresponding hash handle.

The storage system 505 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 505.

The first level of mapping using the A2H table associates logical addresses of respective data pages with respective content-based signatures of those data pages. This is also referred to logical layer mapping.

The second level of mapping using the HMD table associates respective ones of the content-based signatures with respective physical storage locations in one or more of the storage devices 506. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

The logical block addresses or LBAs of a logical layer of the storage system 505 correspond to respective physical blocks of a physical layer of the storage system 505. The user data pages of the logical layer are organized by LBA and have reference via respective content-based signatures to particular physical blocks of the physical layer.

Each of the physical blocks has an associated reference count that is maintained within the storage system 505. The reference count for a given physical block indicates the number of logical blocks that point to that same physical block.

In releasing logical address space in the storage system, a dereferencing operation is generally executed for each of the LBAs being released. More particularly, the reference count of the corresponding physical block is decremented. A reference count of zero indicates that there are no longer any logical blocks that reference the corresponding physical block, and so that physical block can be released.

It should also be understood that the particular arrangement of storage controller processing modules 508C, 508D, 508R and 508M as shown in the FIG. 5 embodiment is presented by way of example only. Numerous alternative arrangements of processing modules of a distributed storage controller may be used to implement functionality for offloading data recovery operations in other embodiments.

Additional examples of content addressable storage functionality implemented in some embodiments by control modules 508C, data modules 508D, routing modules 508R and management module(s) 508M of distributed storage controller 508 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Illustrative embodiments of host devices or storage systems with functionality for offloading data recovery operations can provide a number of significant advantages relative to conventional arrangements. For example, some embodiments provide techniques for offloading data recovery operations that reduce the latency of degraded read IO operations due to a failed storage device.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and storage systems with functionality for offloading data recovery operations will now be described in greater detail with reference to FIGS. 6 and 7. Although described in the context of system 100, these platforms may also be used to implement at least portions of other information processing systems in other embodiments.

Figure 6:
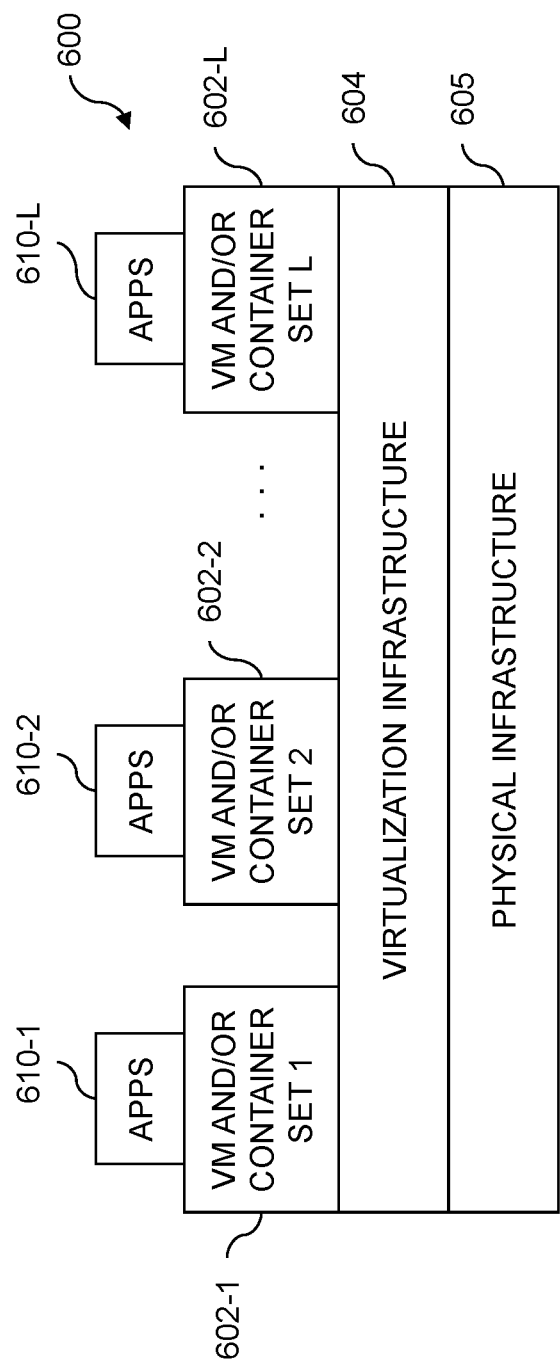
FIGS. 6 and 7 show examples of processing platforms that may be utilized to implement at least a portion of an information processing system in illustrative embodiments.
Figure 7:
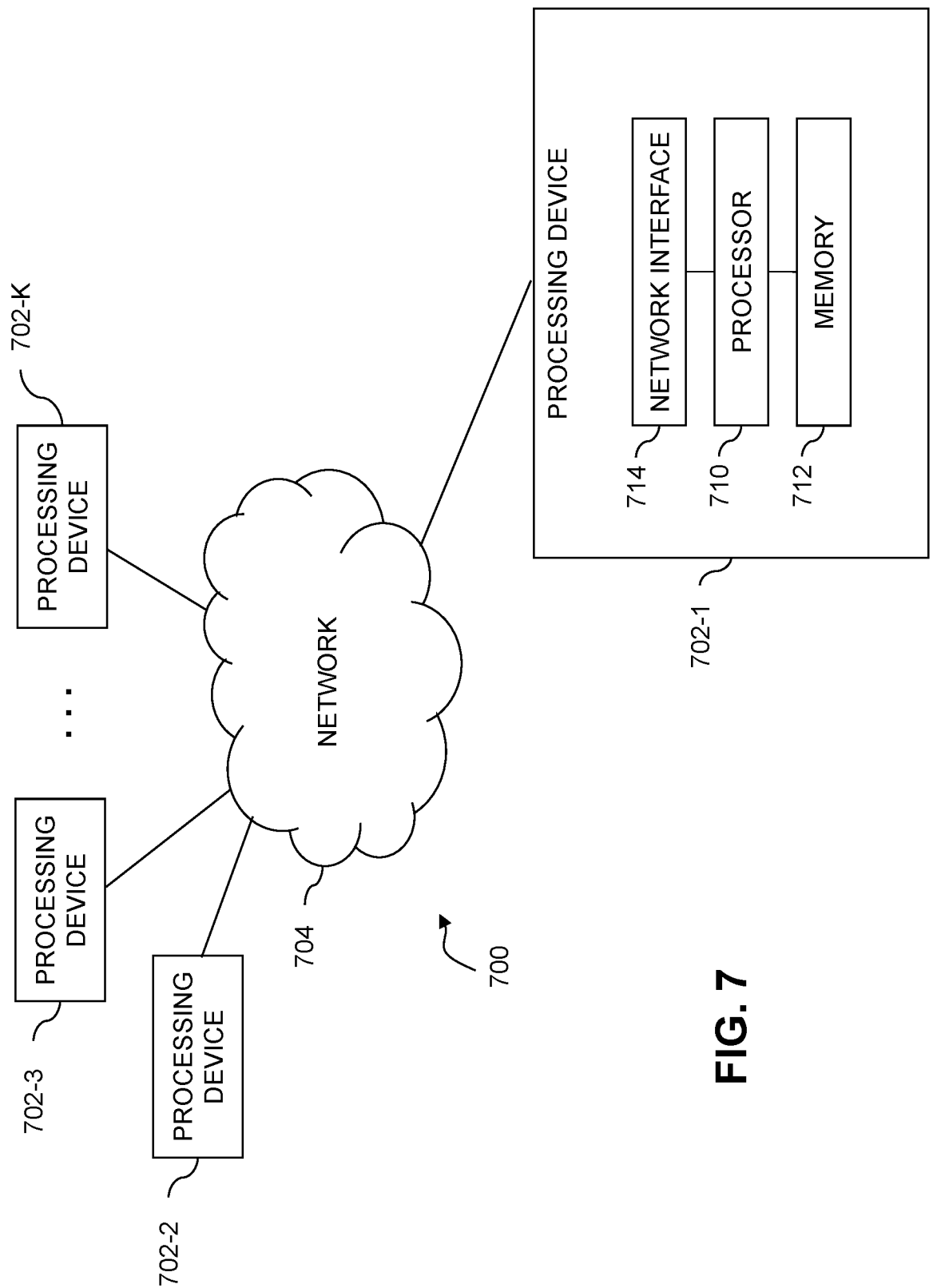

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide functionality for offloading data recovery operations of the type described above for one or more processes running on a given one of the VMs. For example, each of the VMs can implement such functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide functionality for offloading data recovery operations of the type described above for one or more processes running on different ones of the containers. For example, a container host device supporting multiple containers of one or more container sets can implement one or more instances of such functionality or logic.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for offloading data recovery operations as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, RAID arrays or other data striping, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising:
a plurality of storage devices that are configured to store data pages, the data pages being distributed across the plurality of storage devices in a plurality of data stripes, a first storage device of the plurality of storage devices comprising a first processing device;
a storage controller comprising a second processing device;
the second processing device of the storage controller being configured, based at least in part on a failure of a second storage device of the plurality of storage devices:
to identify a data stripe of the plurality of data stripes that corresponds to a given data page that was stored on the failed second storage device; and
to provide an indication of the identified data stripe to the first storage device;
the first processing device of the first storage device being configured, based at least in part on the provided indication:
to obtain data pages corresponding to the identified data stripe from at least one storage device of the plurality of storage devices other than the failed second storage device;
to perform a parity calculation based at least in part on the obtained data pages to rebuild the given data page; and
to store the rebuilt given data page on a third storage device of the plurality of storage devices;
wherein the second processing device of the storage controller is further configured to select the first storage device as a rebuild offload storage device based at least in part on information associated with the given data page.

2. The apparatus of claim 1, wherein the first storage device comprises the third storage device.

3. The apparatus of claim 1, wherein:
the information associated with the given data page comprises a stripe index and a row index of the given data page; and
providing the indication of the identified data stripe to the first storage device comprises providing the indication of the identified data stripe to the first storage device based at least in part on the selection of the first storage device by the second processing device.

4. The apparatus of claim 1, wherein:
the indication of the identified data stripe comprises a first indication of a first portion of the first data stripe;
the second processing device of the storage controller is further configured to provide a second indication of a second portion of the first data stripe to a fourth storage device; and
obtaining the data pages corresponding to the identified data stripe from the at least one storage device of the plurality of storage devices other than the failed second storage device comprises obtaining a first data page from the fourth storage device, the fourth storage device being configured to generate the first data page by performing a parity calculation based at least in part on the second portion of the first data stripe.

5. The apparatus of claim 4, wherein:
the second processing device of the storage controller is further configured to designate the first storage device as a master storage device for rebuilding the given data page and to provide the first storage device with an indication of a location where the first data page is stored;
obtaining the first data page from the fourth storage device comprises obtaining the first data page from the indicated location; and
performing the parity calculation based at least in part on the obtained data pages to rebuild the given data page comprises performing the parity calculation based at least in part on the obtained first data page.

6. The apparatus of claim 5, wherein:
obtaining the data pages corresponding to the identified data stripe from the at least one storage device of the plurality of storage devices other than the failed second storage device comprises obtaining at least two data pages from the storage devices of the plurality of storage devices other than the second and fourth storage devices;
performing the parity calculation based at least in part on the obtained data pages to rebuild the given data page comprises performing a first parity calculation based at least in part on the obtained at least two data pages to generate a second data page; and
performing the parity calculation based at least in part on the obtained first data page comprises performing a second parity calculation based at least in part on the first data page and the second data page to rebuild the given data page.

7. The apparatus of claim 6, wherein the second processing device of the storage controller is further configured:
to determine a first latency associated with a first process of obtaining the data pages corresponding to the identified data stripe from the at least one storage device of the plurality of storage devices other than the failed second storage device and performing the parity calculation based at least in part on the obtained data pages to rebuild the given data page;
to determine a second latency associated with a second process of obtaining the at least two data pages from the storage devices of the plurality of storage devices other than the second and fourth storage devices, performing the first parity calculation and performing a second parity calculation; and
selecting one of the first process and the second process based at least in part on a comparison the first latency to the second latency.

8. The apparatus of claim 4, wherein obtaining the first data page from the fourth storage device comprises obtaining partial parity calculations from the fourth storage device in parallel with performing at least part of the parity calculation to rebuild the given data page.

9. A method comprising:
storing data pages on a plurality of storage devices of a storage system, the data pages being distributed across the plurality of storage devices in a plurality of data stripes, a first storage device of the plurality of storage devices comprising a first processing device;
identifying, by a second processing device of a storage controller of the storage system based at least in part on a failure of a second storage device of the plurality of storage devices, a data stripe of the plurality of data stripes that corresponds to a given data page that was stored on the failed second storage device;
selecting, by the second processing device, the first storage device as a rebuild offload storage device based at least in part on information associated with the given data page;
providing, by the second processing device, an indication of the identified data stripe to the first storage device;
obtaining, by the first processing device based at least in part on the provided indication, data pages corresponding to the identified data stripe from at least one storage device of the plurality of storage devices other than the failed second storage device;
performing, by the first processing device, a parity calculation based at least in part on the obtained data pages to rebuild the given data page; and
storing the rebuilt given data page on a third storage device of the plurality of storage devices.

10. The method of claim 9, wherein the first storage device comprises the third storage device.

11. The method of claim 9, wherein:
the information associated with the given data page comprises a stripe index and a row index of the given data page; and
providing the indication of the identified data stripe to the first storage device comprises providing the indication of the identified data stripe to the first storage device based at least in part on the selection of the first storage device by the second processing device.

12. The method of claim 9, wherein:
the indication of the identified data stripe comprises a first indication of a first portion of the first data stripe;
the method further comprises providing, by the second processing device, a second indication of a second portion of the first data stripe to a fourth storage device; and
obtaining the data pages corresponding to the identified data stripe from the at least one storage device of the plurality of storage devices other than the failed second storage device comprises obtaining a first data page from the fourth storage device, the fourth storage device being configured to generate the first data page by performing a parity calculation based at least in part on the second portion of the first data stripe.

13. The method of claim 12, wherein:
the method further comprises designating, by the second processing device, the first storage device as a master storage device for rebuilding the given data page and providing the first storage device with an indication of a location where the first data page is stored;
obtaining the first data page from the fourth storage device comprises obtaining the first data page from the indicated location; and
performing the parity calculation based at least in part on the obtained data pages to rebuild the given data page comprises performing the parity calculation based at least in part on the obtained first data page.

14. The method of claim 13, wherein:
obtaining the data pages corresponding to the identified data stripe from the at least one storage device of the plurality of storage devices other than the failed second storage device comprises obtaining at least two data pages from the storage devices of the plurality of storage devices other than the second and fourth storage devices;

performing the parity calculation based at least in part on the obtained data pages to rebuild the given data page comprises performing a first parity calculation based at least in part on the obtained at least two data pages to generate a second data page; and performing the parity calculation based at least in part on the obtained first data page comprises performing a second parity calculation based at least in part on the first data page and the second data page to rebuild the given data page.

15. The method of claim 14, wherein method further comprises:

determining, by the second processing device, a first latency associated with a first process of obtaining the data pages corresponding to the identified data stripe from the at least one storage device of the plurality of storage devices other than the failed second storage device and performing the parity calculation based at least in part on the obtained data pages to rebuild the given data page;

determining, by the second processing device, a second latency associated with a second process of obtaining the at least two data pages from the storage devices of the plurality of storage devices other than the second and fourth storage devices, performing the first parity calculation and performing a second parity calculation; and selecting, the second processing device, one of the first process and the second process based at least in part on a comparison the first latency to the second latency.

16. The method of claim 12, wherein obtaining the first data page from the fourth storage device comprises obtaining partial parity calculations from the fourth storage device in parallel with performing at least part of the parity calculation to rebuild the given data page.

17. A computer program product comprising a non-transitory processor-readable storage medium having stored therein program code of one or more software programs, the program code being executable by at least one processing device of a storage system, the storage system comprising a plurality of storage devices that are configured to store data pages, the data pages being distributed across the plurality of storage devices in a plurality of data stripes, a first storage device of the plurality of storage devices comprising a first processing device, the storage system further comprising a storage controller comprising a second processing device, wherein:

the program code, when executed by the second processing device, causes the second processing device, based at least in part on a failure of a second storage device of the plurality of storage devices:

to identify a data stripe of the plurality of data stripes that corresponds to a given data page that was stored on the failed second storage device;

to select the first storage device as a rebuild offload storage device based at least in part on information associated with the given data page; and to provide an indication of the identified data stripe to the first storage device;

the program code, when executed by the first processing device, causes the first processing device, based at least in part on the provided indication:

to obtain data pages corresponding to the identified data stripe from at least one storage device of the plurality of storage devices other than the failed second storage device;

to perform a parity calculation based at least in part on the obtained data pages to rebuild the given data page; and to store the rebuilt given data page on a third storage device of the plurality of storage devices.

18. The computer program product of claim 17, wherein:

the indication of the identified data stripe comprises a first indication of a first portion of the first data stripe;

the program code, when executed by the second processing device, causes the second processing device to provide a second indication of a second portion of the first data stripe to a fourth storage device; and obtaining the data pages corresponding to the identified data stripe from the at least one storage device of the plurality of storage devices other than the failed second storage device comprises obtaining a first data page from the fourth storage device, the fourth storage device being configured to generate the first data page by performing a parity calculation based at least in part on the second portion of the first data stripe.

19. The computer program product of claim 18, wherein:

the program code, when executed by the second processing device, causes the second processing device to designate the first storage device as a master storage device for rebuilding the given data page and to provide the first storage device with an indication of a location where the first data page is stored;

obtaining the first data page from the fourth storage device comprises obtaining the first data page from the indicated location; and performing the parity calculation based at least in part on the obtained data pages to rebuild the given data page comprises performing the parity calculation based at least in part on the obtained first data page.

20. The computer program product of claim 19, wherein:

obtaining the data pages corresponding to the identified data stripe from the at least one storage device of the plurality of storage devices other than the failed second storage device comprises obtaining at least two data pages from the storage devices of the plurality of storage devices other than the second and fourth storage devices;

performing the parity calculation based at least in part on the obtained data pages to rebuild the given data page comprises performing a first parity calculation based at least in part on the obtained at least two data pages to generate a second data page; and performing the parity calculation based at least in part on the obtained first data page comprises performing a second parity calculation based at least in part on the first data page and the second data page to rebuild the given data page.

* * * * *